United States Patent

Tao et al.

[11] Patent Number: 5,874,010
[45] Date of Patent: Feb. 23, 1999

[54] POLE TRIMMING TECHNIQUE FOR HIGH DATA RATE THIN FILM HEADS

[75] Inventors: Arthur Hungshin Tao, Saratoga; Yong-Chang Feng, Livermore; Cheng Tzong Horng; Cherng-Chyi Han, both of San Jose, all of Calif.

[73] Assignee: Headway Technologies, Inc., Milpitas, Calif.

[21] Appl. No.: 682,495

[22] Filed: Jul. 17, 1996

[51] Int. Cl.⁶ ........................................................ B44C 1/22
[52] U.S. Cl. .................................. 216/22; 216/11; 216/51; 216/66; 216/72; 216/76; 216/79; 430/320; 438/3; 438/104
[58] Field of Search .................................. 216/11, 22, 51, 216/66, 72, 76, 79; 430/320; 438/3, 104

[56] References Cited

U.S. PATENT DOCUMENTS

| | | | |
|---|---|---|---|
| 4,244,799 | 1/1981 | Fraser et al. | 204/192.32 |
| 4,791,719 | 12/1988 | Kobayashi et al. | 29/63 |
| 4,857,137 | 8/1989 | Tachi et al. | 216/66 |
| 5,157,570 | 10/1992 | Shukovsky et al. | 360/126 |
| 5,607,599 | 3/1997 | Ichihara et al. | 216/22 |
| 5,695,656 | 12/1997 | Park et al. | 216/22 |

OTHER PUBLICATIONS

VLSI Electronics Microstructure Science, Edited by Einspruch et al., Academic Press, vol. 8, 1984 chapters 11 and 12.

Okumura, Toshiyuki, et al., "High Frequency Read/Write Characteristics for Laminated Fe—Ta—N Heads," IEEE Transactions on Magnetics, vol. 29, No. 6, Nov. 1993, pp. 3843–3845.

Zhu, Jun, et al., "Modeling of Lamination Effects for Thin Film Inductive Heads," 1996 Digests of Intermag '96, 1996 IEEE International Magnetics Conference, p. BB–04.

Koeppe, P.V., et al., "Effect of Pole Tip Alignment on Magnetic Fringing Fields from Recording Heads," J.Appl .Phys. 63 (8), 15 Apr. 1988, pp. 4042–4044.

Hayes, Alan, et al., "Ion Milling for Thin–Film Head Fabrication," Data Storage, Mar./Apr. 1995.

Makino, S., et al., "High Density Recording FeTaN Laminated Hard Disk Heads," IEEE Transactions on Magnetics, vol. 29, No. 6, Nov. 1993, pp. 3882–3884.

Kryder, M.H., et al., "FeAlN/SiO$_2$ and FeAlN/AL$_2$O$_3$ Multilayers for Thin–Film Recording Heads," J.Appl .Phys. 73 (10), 15 May 1993, pp. 6212–6217.

Hu, H.L., et al., "Writing Performance of Narrow Gap Heads Made with Sputtered Laminated FeN Materials on 3800 Oe Coercivity Media," IEEE Transactions on Magnetics, vol. 30, No. 6, Nov. 1994, pp. 3870–3872.

Tsang, Ching, et al., "Gigabit Density Recording Using Dual—Element Mr/Inductive Heads on Thin–Film Disks," IEEE Transactions on Magnetics, vol. 26, No. 5, Sep. 1990, pp. 1689–1693.

Primary Examiner—Bernard P. Codd
Attorney, Agent, or Firm—Skjerven,Morrill,MacPherson Franklin and Friel L.L.P.; Kenneth E. Leeds

[57] ABSTRACT

A method for trimming a pole used in a read-write head comprises the step of depositing a metallic layer on a layer of pole material, patterning the metallic layer so that it can serve as a mask, and ion beam etching the pole material with nitrogen ions. Of importance, a thin nitride layer forms on the metallic layer so that the etch rate of the metallic layer during ion beam etching is slowed. Alternatively, in lieu of the metallic layer, a nitride layer can be used.

23 Claims, 2 Drawing Sheets

POLE TRIMMING TECHNIQUE FOR HIGH DATA RATE THIN FILM HEADS

BACKGROUND OF THE INVENTION

This invention relates to thin film magnetic heads, and in particular, to a method for fabricating narrow track width write heads comprising poles made of laminated pole-piece material.

Typical magnetic disk drives include a magnetic disk and a read-write head for recording data in and reading data from the disk. It has been a goal of industry to increase the recording density in magnetic disks. In order to achieve this goal, read-write heads have been developed comprising an inductive write element and a magnetoresistive read element. In addition, magnetic disks exhibiting high coercivity and low noise have been developed.

Advanced read-write heads with inductive write elements are expected to operate at high frequencies (e.g. greater than 10 MHz). At such frequencies, the permeability of typical head material (e.g. permalloy) tends to drop significantly, thereby leading to degraded performance. Consequently, laminated heads have been proposed to enhance high frequency permeability.

In a laminated head, the top pole is divided into two or more layers separated by thin insulation. This reduces eddy current losses, and therefore enhances high frequency performance. Lamination is discussed by Okumura, et al., "High Frequency Read/Write Characteristics for Laminated Fe—Ta—N Heads", IEEE Trans. Magnetics, Vol. 29, No. 6, November 1993, by Makino, et al., "High Density Recording FeTaN Laminated Hard Disk Heads", IEEE Trans. Magnetics, Vol. 29, No. 6, November 1993, and by Zhu, "Modeling of Lamination Effects for Thin Film Inductive Heads", 1996 Digest of Intermag '96, paper BB-04, incorporated herein by reference.

It is known in the art to use "pole-tip trimming" to reduce the write fringing field. (The fringing field is that portion of the magnetic field generated by the write element and extending toward tracks adjacent to the track being written to. See P.V. Koeppe, et al., "Effect of Pole Tip Alignment on Magnetic Fringing Fields from Recording Heads", J. Appl. Phys. 63(8), 15 Apr. 1988, pp. 4042–4044, incorporated herein by reference.) It is important to minimize the write fringing field, especially when recording in disks having a high track density (i.e., disks recorded using a narrow pole width) because otherwise, the fringing field might partially erase or garble data in adjacent tracks.

At present, ion beam etching ("IBE") is the only proven high-volume etching technique for trimming deposited pole-piece layers into poles. Use of IBE for trimming is discussed by Alan Hayes, et al., "Ion Milling for Thin-Film Head Fabrication", Data Storage, March/April 1995, incorporated herein by reference.

The use of IBE for patterned etching requires a mask to protect the portions of the read-write head that are not to be etched. The most common mask for IBE is photoresist. However, due to relatively low etch selectivity, thick photoresist is required for pole trimming. (Etch selectivity refers to the ratio of the rate at which the pole-piece material is etched to the rate at which the photoresist is etched during IBE.) This limits the efficacy of using photoresist as a mask for trimming very narrow poles (e.g. poles with an aspect ratio greater than 2.0). Further, due to thick photoresist mask requirements, "redeposition" and "shadowing" become a severe problem when trimming narrow, high aspect ratio poles. After the photoresist mask is removed, "fencings" or "rabbit ears" remain above the pole-pieces. To minimize the "fencing" problem, a complicated, long ion-milling process, e.g. using multi-angle ion milling and a tedious post-milling photoresist stripping step, is used.

It is also known in the art to use sputtered $Al_2O_3$ as an IBE mask. During such a process, a) $Al_2O_3$ is blanket-deposited on a workpiece to be patterned; b) photoresist is deposited on the $Al_2O_3$; c) the photoresist is patterned to serve as a mask for etching the $Al_2O_3$; and d) and the pattern in the photoresist is transferred to the $Al_2O_3$ by wet etching. Unfortunately, this results in an uncontrollable "undercut" of the $Al_2O_3$ underneath the photoresist pattern. This undercut prevents $Al_2O_3$ from being used as a mask for trimming narrow track poles.

It is possible to pattern a carbon mask by reactive ion etching. However, carbon poorly adheres to most pole-piece materials, thus limiting its use in pole-piece trimming.

OBJECTS OF THE INVENTION

It is an object of this invention to provide an improved method for trimming pole-piece material during the manufacture of a read-write head.

It is another object of this invention to develop an improved IBE method to trim very narrow write head poles.

It is another object of this invention to use an improved IBE method to trim laminated pole-piece layers to fabricate a high data rate thin film head.

It is another object of this invention to provide a mask used during pole-piece trimming wherein the etching step employed during trimming exhibits a high degree of selectivity, tending to etch the pole-piece material at a high rate compared to the etch rate of the mask material.

It is another object of this invention to provide a transition metal mask for use during ion beam etching.

SUMMARY

A method in accordance with the present invention comprises the step of depositing a metallic mask layer on a layer of pole material, patterning the metallic mask layer to expose unwanted portions of the pole material, and etching the exposed portions of the pole material using an ion beam comprising nitrogen ions. Of importance, because of the presence of energetic nitrogen ions (which penetrate into the metallic mask layer), the selectivity of the etching process is improved.

In one embodiment, IBE etching is used. The mask layer material can be a transition metal such as Ti, Nb, Mo, Ta and W. It is believed that these materials react with nitrogen to form a nitride layer. It is further believed that this nitride layer has a low IBE etch rate, and is thus responsible, at least in part, for the enhanced selectivity of the etching step.

In another embodiment, instead of using a metallic mask, a nitride mask can be used (e.g. a nitride of a transition metal such as Ti, Nb, Mo, Ta and W). When a nitride mask is used, nitrogen need not be present during IBE etching.

In yet another embodiment, a nitride mask is used, and nitrogen is present in the ion beam used for etching pole material.

BRIEF DESCRIPTION OF THE DRAWINGS

FIG. 3 illustrates a read-write element in accordance with our invention in which the bottom pole-piece is etched completely through.

DETAILED DESCRIPTION

Figure 1A:
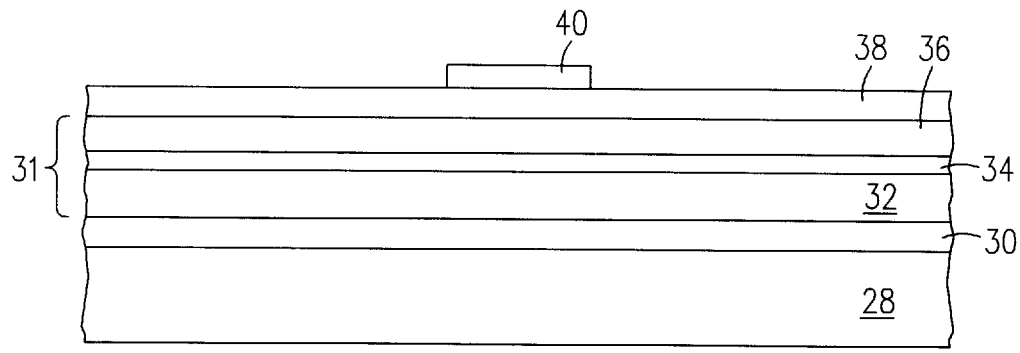
FIGS. 1a to 1d illustrate in cross section a portion of a read-write head during a first manufacturing process in accordance with our invention.

FIGS. 1a to 1d illustrate a portion of a read-write head 10 during a manufacturing process in accordance with a first embodiment of our invention. FIG. 1a shows a pole layer 28, a write gap layer 30, a laminated top pole 31 (which comprises a first pole-piece layer 32, an insulation interlayer 34, and a second pole-piece layer 36), an IBE mask layer 38, and a patterned photoresist layer 40. Pole layer 28, first pole-piece layer 32 and second pole-piece layer 36 of laminated top pole 31 are subsequently patterned to form an inductive write-element for a read-write head. In one embodiment, the inductive write element is part of an inductive-write MR read head (also known as a merged head). In such an embodiment, pole layer 28 is a shared pole, and is formed over a MR read structure, such as the structure described in U.S. patent application Ser. No. 08/635,097, filed by Han, et al. on Apr. 17, 1996, incorporated herein by reference. The MR read structure is typically formed on a wafer, e.g. a ceramic wafer such as an $Al_2O_3$—TiC wafer. (This wafer is eventually cut into individual read-write heads after the inductive write element is completely formed.)

Layers 28, 32 and 36 are typically formed of permalloy. Alternatively, these layers can be made from other high magnetic moment alloys such as iron-base crystalline alloys or cobalt-base amorphous alloys. It is generally desirable that the magnetic anisotropy of the magnetic film be below 10 or 20 Oe, the magnetic permeability in sheet form should be greater than 1000, and the coercivity be below about 1 Oe. Layer 28 and top pole 31 are each typically between about 3 and 4 μm thick. However, other thicknesses may be used.

In one embodiment, layers 28, 32 and 36 are an NiFe alloy, e.g. 82% Ni and 18% Fe.

Interlayer 34 is typically an insulating material such as $Al_2O_3$, $SiO_2$AlN or a ferrite film. In one embodiment, layer 34 is between 1.5 and 5.0 nm thick. Layer 30 defines the gap region in the subsequently formed write-element of the read-write head. Layer 30 is typically $Al_2O_3$ or $SiO_2$, and has a thickness of about 0.3 microns.

Layers 28 to 38 can be deposited in any conventional manner, e.g. a vacuum deposition process such as sputtering in a single pump-down. The sputter conditions depend on the apparatus used to sputter. When sputtering the pole-piece material, the power used can be between 1 and 2 kw with DC magnetron sputtering. The gas pressure can be 1 to 5 mtorr, and the substrate bias can be about −50v. The pole-piece material can be deposited in an oriented magnetic field applied to the substrate. Layers 30 and 34 can be RF-diode sputtered. In one embodiment, an MRC sputtering system is used with rectangular sputtering targets. Layers 28, 32 and 36 can also be formed by sputtering a "seed layer" and plating NiFe material onto the seed layer, e.g. as described in above-incorporated U.S. patent application Ser. No. 08/635,097. Layers 32 to 38 are typically blanket deposited on top of layer 30.

Photoresist layer 40 is deposited and photolithographically patterned in a conventional manner. Photoresist layer 40 can be positive or negative resist. In lieu of photolithography, other patterning techniques, e.g. e-beam patterning can be used.

Mask layer 38 is typically a transition metal (e.g. a refractory metal) capable of forming a nitride. Depending on the material being used for layers 30, 32 and 36, mask layer 38 is typically between about 1.5 to 3.0 μm thick. In one embodiment, layer 38 is Mo, Nb, Ta, Ti, W or an alloy thereof. In another embodiment, mask layer 38 is a nitride material such as the nitride of Mo, Nb, Ta, Ti or W. In the case where layer 38 is a nitride, it can be formed by reactive sputtering in the presence of Ar and $N_2$.

Figure 1B:
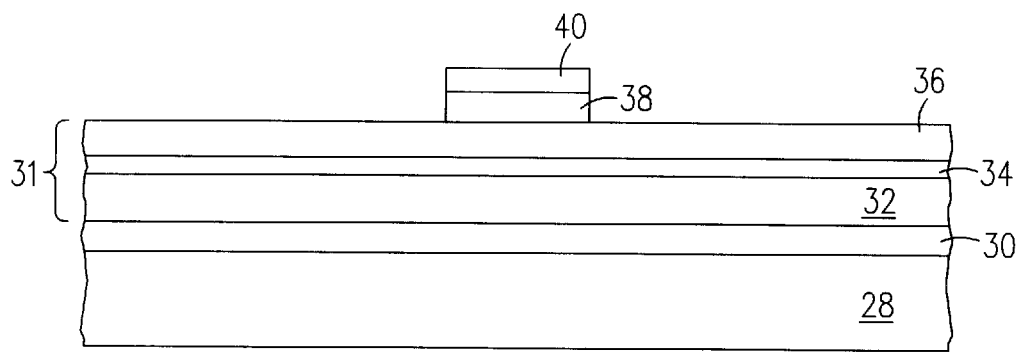

Referring to FIG. 1b, layer 38 is patterned by an anisotropic (directional) reactive ion etching ("RIE") process during which the pattern in photoresist 40 is transferred to layer 38 using $CF_4$ or $SF_6$ as the process gas. The power used during RIE can be 100 to 200 watts for a 10 inch electrode. Gas pressure is typically 5 to 50 mtorr. The electrode voltage is typically 200 to 300 volts. Of importance, since photoresist 40 is not used as an IBE mask for trimming layers 28 to 36, photoresist 40 may be relatively thin.

Figure 1C:
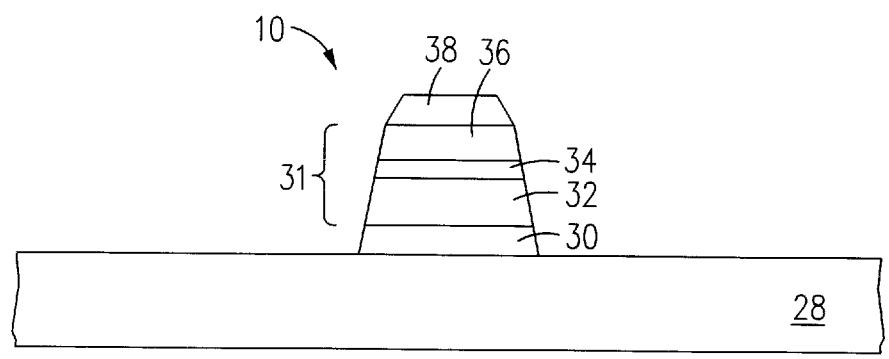

Referring to FIG. 1c, photoresist 40 is stripped in a conventional manner, e.g. by n-methyl pyrolidone solution. Layers 28 to 36 are then subjected to a IBE process using an ion beam comprising a mixture of nitrogen ions and other ions, such as argon ions. The ion beam is generated in a conventional manner using conventional ion beam etching apparatus. In such an apparatus, a nitrogen-argon atmosphere is ionized and ions are accelerated toward the structure to be etched by applying a high voltage to a grid (not shown). In one embodiment, the gas mixture that is ionized and used to generate the ion beam is a mixture having a nitrogen/argon ratio greater than or equal to about 1 to 1 by volume, preferably greater than 1.3 to 1, and in one embodiment, 2 to 1. One skilled in the art can adjust the selectivity of the etching process by adjusting the argon/nitrogen ratio. In the alternative, an ion beam consisting solely of nitrogen ions can be used. In yet another alternative, a mixture of nitrogen ions and another type of ion (such as Kr) can be used.

Of importance, during IBE, it is believed that the energetic nitrogen ions that strike the structure being etched do not stop at the surface, but penetrate for some distance into the structure. The implanted nitrogen ions react with the material in layer 38 to form a protective nitride surface layer. This nitride surface layer etches much more slowly than the pole-piece material in layers 28, 32 and 36. Table I below lists the etch rates of various materials during IBE at an ion current density of 1 $mA/cm^2$ and an ion energy of 500 eV.

| Material Being Etched | IBE Using Ar as the etching ion | | IBE using nitrogen as the etching ion | |
|---|---|---|---|---|
| | Etch rate (nm/min) | Selectivity | Etch rate (nm/min) | Selectivity |
| $Ni_{80}Fe_{20}$ | 50 | 1.00 | 25 | 1.00 |
| Ni | 66 | 0.75 | 29 | 0.86 |
| Fe | 53 | 0.94 | 18 | 1.4 |
| Co | 53 | 0.91 | | |
| Mo | 54 | 0.93 | 7.1 | 3.5 |
| Nb | 44 | 1.13 | | |
| Ta | 42 | 1.19 | 2.8 | 8.9 |
| Ti | 38 | 1.30 | | |
| W | 38 | 1.30 | 5.9 | 4.2 |
| C | 4.4 | 11.3 | | |
| TaC | 15 | 3.33 | | |
| Sputtered $Al_2O_3$ | 20 | 2.50 | | |
| AZ resist | 40 | 1.25 | | |

As can be seen, when layer 38 is a nitride forming material such as Mo, Ta or W, IBE etching is much more selective than commonly used AZ photoresist.

As can be seen in FIG. 1c, at the conclusion of the manufacturing process, portions of layer 38 remain after ion beam etching and are not removed from the top of layer 36.

Figure 1D:
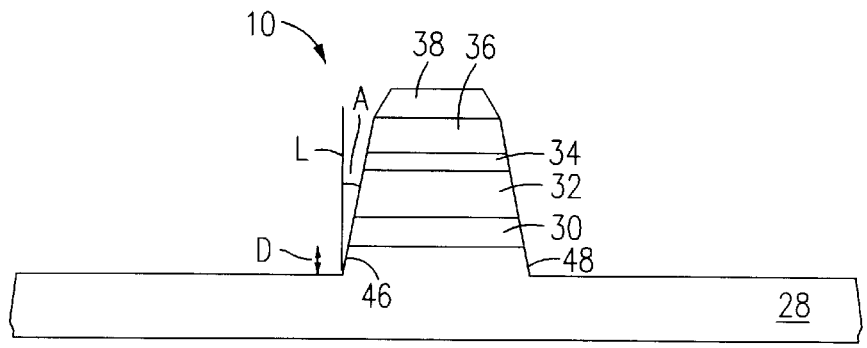

In one embodiment, IBE can be continued to mill through layers 36, 34, 32, 30 and into layer 28 (see FIG. 1d). This is done, for example, to reduce the write fringing field to further reduce the write track width. In such an embodiment, depending upon the depth D of etching into layer 28, an optional photoresist mask may be placed elsewhere on the wafer to protect other structures thereon, such as conductor leads or an electrolapping guide.

The profile of the write pole tip has side walls such as walls 46, 48 which typically slope at an angle A, e.g., typically less than 10°, and generally between 6 and 7 degrees but preferably minimized. (Angle A is the angle formed by side 46 and line L perpendicular to the plane of layer 28). The slope of walls 46, 48 can be adjusted by controlling the angle at which the ion beam strikes the pole layer material.

Figure 2:
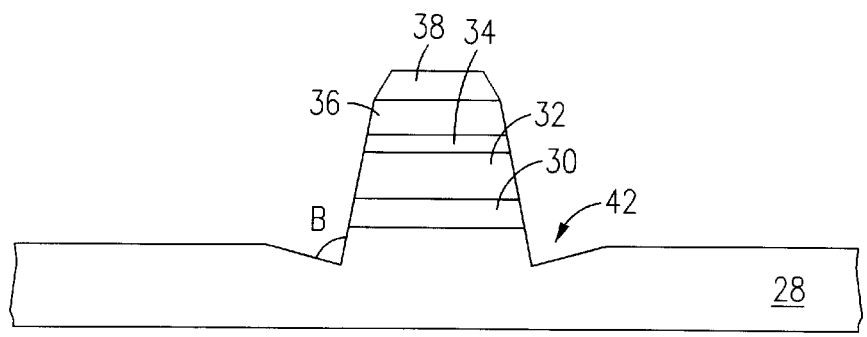
FIG. 2 illustrates a write element comprising a trench in the lower pole piece of the write element.

Depending on the pole-tip aspect ratio (thickness/width), the profile (i.e. contour) of the trimmed pole can be controlled by etch-mask thickness and ion-milling angle. The ion-milling incidence angle is typically between 100° and 300°. A low incidence angle tends to create a trench around the pole edge (e.g. trench 42 in FIG. 2), and may be desirable when etching into lower pole layer 28. In FIG. 2, the walls of trench 42 are typically at an angle B of about 90°.

In one embodiment, layers 32 and 36 can have magnetostrictive effects of the opposite sign to avoid undesirable magnetostrictive effects. Magnetostriction is a function of alloy composition, which also determines magnetic moment. Merely by way of example $Ni_{83} Fe_{17}$ has a magnetic moment of 10 kilogauss ("KG") and negative magnetostriction, whereas $Ni_{45} Fe_{55}$ has a magnetic moment of 17 KG and positive magnetostriction. One can adjust the heights and compositions of layers 32 and 36 in a known manner so that the magnetostriction effects cancel.

In one embodiment, the pole-piece elements constructed in accordance with our invention perform both the read and write functions in an inductive-read inductive-write head. In such an embodiment, layer 28 is a bottom pole layer and is formed on a wafer substrate 44 (see FIG. 3) or an insulating layer formed on a wafer substrate. In such an embodiment, layer 28 is typically etched completely through during ion beam etching.

Figure 3:
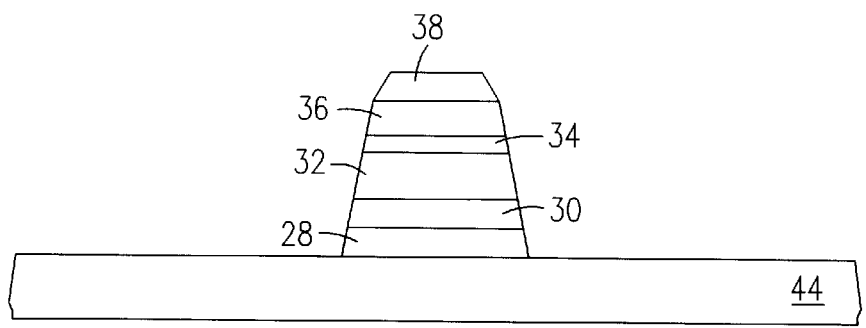

While the embodiments of FIGS. 1 to 3 include a laminated head, in an alternative embodiment, a non-laminated head is provided, i.e. instead of providing top pole 31 comprising layers 32 to 36, the top pole comprises a single layer of a material such as permalloy.

As mentioned above, layer 38 can be a nitride layer, such as the nitride of a transition metal such as Ta, Ti, W, Mo or Nb. When layer 38 in a nitride material, it can be formed by reactive sputtering. Also, when layer 38 is a nitride material, nitrogen ions need not be used during ion beam etching. In other embodiments, layer 38 is formed by non-reactive sputtering. Also, in other embodiments, nitrogen ions are used when layer 38 is a nitride material.

While the invention has been described with respect to specific embodiments, those skilled in the art will recognize that changes can be made in form and detail without departing from the spirit and scope of the invention. For example, layers 28 to 38 can have thicknesses other than those set forth above. In addition, these layers can be constructed from different materials. Various IBE systems can be used. One such system is model No. 38JG, available from Commonwealth Scientific Corporation of Virginia, but other systems can also be used. Accordingly, all such changes come within the present invention.

We claim:

1. A method for manufacturing an inductive write element comprising the steps of:

providing a structure comprising a first layer of pole material, an insulating layer formed on said first layer of pole material, and a second layer of pole material formed on said first insulating layer;

forming a patterned transition metal nitride layer on said second layer of pole material; and subjecting said second layer to a patterning step by ion beam etching said second layer of pole material, said patterned transition metal nitride layer serving as a mask during said step of subjecting.

2. Method of claim 1 wherein nitrogen ions are used during said ion beam etching.

3. A method for manufacturing an inductive write element comprising the steps of:

providing a structure comprising a first layer of pole material a first insulating layer formed on said first layer of pole material, and a second layer of pole material formed on said first insulating layer;

forming a patterned layer comprising a transition metal on said second layer of pole material; and subjecting said second layer of pole material to a patterning step by ion beam etching said second layer of pole material with an ion beam, said ion beam comprising nitrogen ions, said patterned layer serving as a mask during said step of subjecting said second layer of pole material to a patterning step, wherein said transition metal comprises a metal selected from the list consisting of Ti, Nb, Mo, Ta and W.

4. Method of claim 3 wherein said step of forming said patterned layer comprises the steps of:

depositing a layer of said transition metal on said second layer of pole material;

depositing photoresist on said layer of transition metal;

patterning said photoresist to expose portions of said layer of transition metal; and removing said exposed portions of said layer of transition metal.

5. Method of claim 4 wherein said step of removing comprises the step of reactive ion etching said exposed portions.

6. Method of claim 3 wherein said ion beam etching etches through said first insulating layer and at least part of said first layer of pole material.

7. Method of claim 3 wherein said first layer of pole material is formed on a gap insulating layer, said gap insulating layer being formed on a third layer of pole material and wherein said ion beam etching etches through said first insulating layer, said first layer of pole material, said gap insulating layer, and at least part of said third layer of pole material.

8. Method of claim 3 wherein said first layer of pole material, said first insulating layer, and said second layer of pole material are formed by sputtering.

9. Method of claim 3 wherein said ion beam further comprises argon ions.

10. Method of claim 9 wherein the ratio of nitrogen ions to argon ions is greater than one.

11. Method of claim 9 wherein the ions in said ion beam are generated from a nitrogen-argon atmosphere in which the ratio of nitrogen to argon by volume is greater than 1.

12. Method of claim 3 wherein the ratio of the etching rate of said second layer of pole material to the etching rate of said patterned layer is greater than or equal to about 2.

13. Method of claim 3 wherein the presence of said nitrogen ions causes the etch rate of said patterned layer to be substantially less than what the etch rate would be in the absence of said nitrogen ions.

14. Method of claim 3 wherein said nitrogen ions substantially increase the selectivity of said ion beam etching.

15. Method of claim 3 wherein said nitrogen ions within said ion beam reduce the etching rate of said transition metal compared to the etching rate of said transition metal if said nitrogen ions were absent.

16. Method of claim 15 wherein said nitrogen ions react with said transition metal so that the etch rate of said transition metal is reduced compared to the etch rate of said transition metal if said nitrogen ions were absent.

17. Method of claim 3 wherein said nitrogen ions react with said transition metal so that the etch rate of said transition metal is reduced compared to what the etch rate would be in the absence of said nitrogen ions.

18. Method of claim 3 in which said ion beam etching does not use a chemical reaction to etch said pole material.

19. Method of claim 3 wherein said pole material comprises NiFe.

20. Method of claim 3 wherein said pole material is a cobalt-based amorphous alloy.

21. Method of claim 3 wherein said pole material is a crystalline iron alloy.

22. Method of claim 3 wherein the nitrogen ions reduce the etch rate of the transition metal within said patterned layer more than they reduce the etch rate of the pole material, compared to what the etch rate of said transition metal within said patterned layer and the etch rate of said pole material would be in the absence of said nitrogen ions.

23. A method for manufacturing an inductive write element comprising the steps of:

providing a structure comprising a first layer of pole material, a first insulating layer formed on said first layer of pole material, and a second layer of pole material formed on said first insulating layer;

forming a patterned layer comprising a transition metal on said second layer of pole material; and subjecting said second layer of pole material to a patterning step by ion beam etching said second layer of pole material with an ion beam, said ion beam comprising nitrogen ions, said patterned layer serving as a mask during said step of subjecting said second layer of pole material to a patterning step, wherein said transition metal comprises Ta.

* * * * *